(12) United States Patent
Kong et al.

(10) Patent No.: US 6,956,003 B2
(45) Date of Patent: Oct. 18, 2005

(54) CATALYST SYSTEM FOR ETHYLENE (CO)-POLYMERIZATION

(75) Inventors: Gapgoung Kong, Sugarland, TX (US); Honglan Lu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 10/726,837

(22) Filed: Dec. 3, 2003

(65) Prior Publication Data

US 2005/0124488 A1 Jun. 9, 2005

(51) Int. Cl.$^7$ ................................................. B01J 31/00
(52) U.S. Cl. ...................... 502/150; 502/117; 525/121; 526/90
(58) Field of Search ................................. 502/150, 117; 526/90; 525/121

(56) References Cited

U.S. PATENT DOCUMENTS

| | | | | |
|---|---|---|---|---|
| 3,113,115 | A | | 12/1963 | Ziegler et al. ............... 252/429 |
| 4,496,660 | A | * | 1/1985 | Gessell et al. ............... 502/111 |
| 4,544,646 | A | * | 10/1985 | Pullukat et al. ............. 502/109 |
| 5,047,468 | A | | 9/1991 | Lee et al. ...................... 525/53 |
| 5,064,798 | A | | 11/1991 | Chang ........................ 502/111 |
| 5,091,353 | A | | 2/1992 | Kioka et al. ................ 502/111 |
| 5,192,731 | A | | 3/1993 | Kioka et al. ................ 502/110 |
| 5,260,245 | A | | 11/1993 | Mink et al. .................. 502/115 |
| 5,336,652 | A | | 8/1994 | Mink et al. .................. 502/125 |
| 5,561,091 | A | | 10/1996 | Mink et al. .................. 502/115 |
| 5,990,251 | A | | 11/1999 | Gelus ....................... 526/125.7 |
| 6,271,165 | B1 | * | 8/2001 | Jacobsen et al. ............ 502/104 |
| 6,284,701 | B1 | * | 9/2001 | Yoon et al. .................. 502/152 |
| 6,303,724 | B1 | * | 10/2001 | Goodall et al. ............. 526/266 |
| 6,391,989 | B1 | * | 5/2002 | Bohnen et al. ............. 526/134 |
| 6,403,518 | B2 | * | 6/2002 | Ward .......................... 502/103 |
| 6,403,739 | B1 | * | 6/2002 | Tanaglia et al. .......... 526/169.2 |
| 6,500,906 | B1 | | 12/2002 | Kong et al. ............... 526/124.2 |
| 6,538,080 | B1 | | 3/2003 | Swindoll et al. ............. 526/160 |
| 6,559,088 | B1 | * | 5/2003 | Shamshoum et al. ....... 502/115 |
| 6,590,046 | B2 | | 7/2003 | Kong et al. .................. 526/151 |
| 6,656,866 | B2 | * | 12/2003 | Wenzel et al. .............. 502/117 |
| 6,696,532 | B2 | * | 2/2004 | Cavell et al. ................ 526/131 |
| 6,727,329 | B2 | * | 4/2004 | Vogel .......................... 526/127 |
| 6,730,755 | B2 | * | 5/2004 | Gao et al. .................... 526/129 |
| 6,780,947 | B1 | * | 8/2004 | Sommazzi et al. .......... 526/161 |
| 6,797,791 | B2 | * | 9/2004 | Gindelberger .............. 526/160 |
| 6,800,701 | B2 | * | 10/2004 | Campbell, Jr. et al. ........ 556/11 |
| 6,809,209 | B2 | * | 10/2004 | Rodriguez ...................... 556/1 |
| 6,812,184 | B1 | * | 11/2004 | Vaughan et al. ............. 502/117 |
| 6,821,921 | B2 | * | 11/2004 | Theopold et al. ........... 502/150 |
| 6,822,057 | B2 | * | 11/2004 | Rodriguez ................... 526/133 |
| 6,825,371 | B2 | * | 11/2004 | Sugano et al. ................. 556/11 |
| 6,841,498 | B2 | * | 1/2005 | Kong et al. ................. 502/103 |

OTHER PUBLICATIONS

Department of Polymer Science—University of Southern Mississippi; Ziegler–Natta Vinyl Polymerization, 1995; 10 pages.

* cited by examiner

*Primary Examiner*—J. A. Lorengo
*Assistant Examiner*—Jennine Brown
(74) *Attorney, Agent, or Firm*—Howrey LLP

(57) ABSTRACT

A catalyst system for (co)-polymerizing ethylene or ethylene with α-olefin is disclosed. The catalyst system utilizes a catalyst component that contains the product of a reaction of an early transition metal complex such as a titanium alkoxide with a cyclic diene-containing compound such as indene. The catalyst system also utilizes a solid magnesium halide support and an alkylaluminum co-catalyst. The catalyst system of present invention produces polyethylene with a narrow molecular weight distribution and a narrow compositional distribution.

29 Claims, No Drawings

CATALYST SYSTEM FOR ETHYLENE (CO)-POLYMERIZATION

FIELD OF THE INVENTION

The invention relates to the field of polymer chemistry and, more specifically, to a catalyst system useful for polymerizing ethylene and for co-polymerizing ethylene with α-olefins. In particular, a catalyst component comprising an early transition metal complex and a cyclic diene is disclosed. The catalyst component is useful in an in-situ catalyst system that also comprises a solid magnesium halide support and an alkylaluminum co-catalyst. The catalyst system of the present invention is useful for producing linear low density copolymers of ethylene (LLDPE).

BACKGROUND OF THE INVENTION

Polyolefin polymers are well known and are useful in many applications. In particular, linear low-density polyethylene polymers (LLDPE) are in demand because they possess properties that distinguish them from other polyethylene polymers, such as branched ethylene homopolyethylene polymers (low density polyethylene, LDPE). LLDPE has a density of 0.910 to 0.945 g/cm3.

The market for LLDPE has grown rapidly, particularly for applications such as blown and cast films, injection molding, rotational molding, blow molding, pipe, tubing, and wire and cable applications. A principal area for LLDPE copolymers is in film forming applications because these co-polymers typically exhibit high dart impact, high Elmendorf tear, high tensile strength and high elongation, in both the machine direction (MD) and the transverse direction (TD), compared with counterpart LDPE resins. U.S. Pat. No. 4,076,698, by Anderson et al., describes some of these properties. Increasingly, there is a demand in the market for high performance LLDPE resin having better impact strength, higher transparency, and less wax content.

Much of the effort to improve LLDPE properties has been directed at developing new catalyst systems for producing ethylene co-polymer having a narrow molecular weight distribution and/or a narrow branching compositional distribution. Single site catalyst systems employing organometallic compounds such as metallocenes or methylaluminoxane (MAO) have been shown to provide superior control of these parameters. However, single site catalyst systems have not been widely employed in gas phase processes, which are the most widely used industrial means of producing commodity LLDPE. Commercial use of single site catalyst systems has been hindered because these systems are difficult to incorporate into existing plants. Furthermore, many organometallic compounds are difficult to immobilize onto supports because they are insoluble in aliphatic hydrocarbon solvents.

Titanium based Ziegler-Natta type catalyst systems are well known in the art and have the advantage of being applicable in existing gas phase processes. An example of such a catalyst system is described in U.S. Pat. No. 3,113,115, by Ziegler et al. Much effort has been directed at developing Ziegler-Natta catalyst systems to produce ethylene (co)-polymer having narrow molecular weight and/or branching compositional distributions.

U.S. Pat. Nos. 5,260,245, 5,336,652, and 5,561,091, by Mink et al., describe a catalyst system in which dialkylmagnesium and silane compounds are reacted with the OH groups of a silica support, which is then contacted with a transition metal halide to form a relatively homogeneous active site. This catalyst system produces more homogeneous ethylene polymer or co-polymer than does the traditional magnesium-titanium(IV) halide based Ziegler-Natta system.

U.S. Pat. No. 5,047,468, by Lee et al., describes a catalyst system for producing LLDPE. The catalyst is obtained by dissolving $MgCl_2$ with $[TiCl_3(AlCl_3)_{1/3}]$ in THF to make a solution containing $MgCl_2$ and titanium halide, which is then immobilized on silica.

U.S. Pat. Nos. 5,091,353 and 5,192,731, by Kioka et al., describe a catalyst system in which a magnesium compound is contacted with an organnoaluminum compound to produce a solid magnesium aluminum complex, which is then reacted with tetravalent titanium to afford a solid catalyst.

U.S. Pat. No. 4,748,221 and European Patent No. 0 703 246 A1 describe a catalyst system in which magnesium metal is reacted with butylchloride in a non-polar solvent. The reaction is initiated with $Ti(OR)_4$ and sustained by further treatment with $TiCl_4/Ti(OR)_4/BuCl$ to produce a catalyst suitable for ethylene co-polymerization in a gas phase process.

The references described above are directed at improving titanium catalysts by controlling the solid catalyst formation process in an attempt to achieve a more homogeneous active site, leading to greater control of the molecular weight distribution and/or branching compositional distribution of the resulting polymers. Such control is difficult with supported catalysts because active site formation is greatly influenced by the interaction of the titanium complex with the heterogeneous surface of the magnesium halide support. This effect is so great that the process of immobilizing the titanium component onto the magnesium halide support often overwhelms the original coordination properties of titanium component. Attempts to control the coordination environment of the titanium component often fails to achieve improved catalyst properties because the effects of these improvements are lost during the immobilization process. Meticulous control of the catalyst preparation process has been required to ensure homogeneous active site formation during immobilization in titanium-magnesium halide based Ziegler-Natta catalyst.

U.S. Pat. Nos. 6,500,906 B1 and 6,590,046 B2, by Kong et al., describe a catalyst system that does not require immobilization of the titanium component onto the magnesium halide support prior to use. The catalyst system employs a liquid phase transition metal solution in-situ with solid magnesium halide support. The transition metal solution is prepared by reacting $Mg[AlR'(OR)_3]_2$ with a nitrogen bound chelating ligand (N-chelate ligand) such as dialkylcarbodiimide, and then with $MX_4$ as described in equation (1), where M is Ti or Zr. This method has the advantage of not relying on a complicated immobilization process to ensure improved catalyst properties.

There is a need in the art for titanium base catalyst systems capable of providing polymers having controlled molecular weight distributions and/or compositional distributions. Such catalysts will require that the coordination properties of the titanium complexes not be deteriorated upon immobilizing the titanium complex on a magnesium halide support. Ideally, methods of providing such catalysts will not depend on meticulous control of the catalyst formation process, as such control is difficult and expensive to exert in the context of large-scale commercial utilization.

SUMMARY OF THE INVENTION

Accordingly, it is an object of the present invention to provide an in-situ catalyst system capable of producing polymers having controlled molecular weight distributions and/or compositional distributions. The methods of producing catalysts of the present invention do not rely on meticulous control of an immobilization process. The present catalysts contain a transition metal active center that is not deteriorated by its interaction with the surface of a magnesium halide support.

One aspect of the present invention is a catalyst component prepared by:

(a) reacting a compound having the formula $R_3M$ with an amine having a nitrogen-hydrogen bond;

(b) reacting the product of (a) with a dialkylmagnesium compound;

(c) reacting a compound containing a cyclic diene group with an early transition metal compound; and (d) reacting the product of (b) with the product of (c);

wherein R is hydrocarbon and M is selected from the group consisting of aluminum, boron, gallium, and indium. Another aspect of the invention is a catalyst system effective for catalyzing the (co)-polymerization of α-olefin, wherein the catalyst system comprises such a catalyst component. The catalyst system of the present invention typically also comprises a solid magnesium halide support and an alkylaluminum co-catalyst such as triethylaluminum, tributylaluminum, trioctylaluminum, and trimethylaluminum.

A still further aspect of the present invention is a method of (co)-polymerizing ethylene and/or α-olefin by contacting an ethylene and/or α-olefin feed stock with a catalyst system described above. According to one embodiment, a solution of the catalyst component, a solid magnesium halide support, and an aluminum co-catalyst are charged to a reactor for (co)-polymerizing olefin. Because the transition metal component is not deposited on the magnesium halide support prior to use, the influence of the surface properties of the support on the transition metal active center is minimized. Alternatively, the catalyst component and the magnesium halide support can be mixed in a solution having a pre-selected M'/Mg (M'=transition metal) ratio and the solution can be charged to a polymerization reactor.

DETAILED DESCRIPTION OF THE INVENTION

As used herein, "(co)-polymerization" refers to both homo-polymerization and co-polymerization. For example, it may refer to the polymerization of ethylene or the polymerization of an α-olefin. It may refer to the polymerization of different α-olefins to yield co-polymers and it may also refer to the co-polymerization of ethylene with one or more α-olefins. Likewise, the term "(co)-polymer" includes both homo-polymer and co-polymer. The term "catalyst component" refers to a component that enhances the catalytic activity of a catalyst system compared to the catalytic activity of the system without the component. The system may or may not be catalytic in the absence the catalyst component.

One aspect of the present invention is a catalyst component prepared by:

(a) reacting a compound having the formula $R_3M$ with an amine having a nitrogen-hydrogen bond;

(b) reacting the product of (a) with a dialkylmagnesium compound;

(c) reacting a compound containing a cyclic diene group with an early transition metal compound; and (d) reacting the product of (b) with the product of (c);

wherein R is hydrocarbon and M is selected from the group consisting of aluminum, boron, gallium, and indium. A magnesium complex (the product of step (b) above) is prepared by the consecutive reaction of a group 13 alkyl-metal compound with a suitable amine followed by reaction with an alkylmagnesium compound ($R''_2Mg$). Schematically, the reactions can be represented:

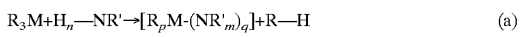

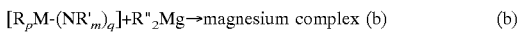

where M is a group 13 metal, R, R' and R" are hydrocarbon, and m, n, p, and q are numbers. According to one embodiment of the invention, R, R' and R" are independently $C_{1-13}$, and can be branched, straight-chained, or cyclic.

Reactions (a) and (b) are typically carried out in a non-polar solvent such as a hydrocarbon solvent. Examples of hydrocarbon solvents include hexane, heptane, and toluene. Typically, mild heat and gas are evolved during reaction (a), indicating the reaction of the active hydrogen with the alkyl-metal bond, presumably causing alkane elimination to form $[R_pM\text{-}(NR'_m)_q]$. Depending on the character of active hydrogen, a certain level of active hydrogen may remain with the amine, yielding Lewis Acid-base adduct $[R_pM\text{-}(NR'_m)_q][H_nNR'_m]$. Likewise, the product of (a) may be mixture $[R_pM\text{-}(NR'_m)q]$ and various forms of $[R_pM\text{-}(NR'_m)_q][H_nNR'_m]$. Regardless, the product of (a) can be used in reaction (b) without further purification or separation of the reaction products. According to one embodiment, dialkylmagnesium is added to the product of reaction (a) and the mixture is stirred for about an hour. The reaction temperature is typically 10 to about 40° C. The product of reaction (b) is typically very soluble in non-polar solvent and stable at room temperature. The product in solution obtained from (b) can typically be used (in reaction (d)) without further purification or separation.

Examples of amine compounds suitable for the present invention include any amines containing a terminal hydrogen-nitrogen bond. Examples of particular amines are primary or secondary amines containing more then four carbon atoms, for example butylamine, t-butylamine, hexylamine, heptylamine, dibutylamine, di-sec-butylamine, di-tert-butylamine, dihexylamine, dicyclo-hexylamine, piperidine, and aromatic amines such as aniline or aniline derivatives including 2,6-diethylaniline, 2,6-di-tert-butylaniline.

Group 13 metal-alkyl metal compounds suitable for the present invention are organometallic compounds containing reactive alkyl-metal bonds and represented by formula $R_3M$ where M are group 13 elements. Examples of preferred alkylmetal compounds include triethylborane, tributylborane, trimethylaluminum, triethylaluminum, triisobutylaluminum, trihexylaluminum, trioctylaluminum, and trimethylgallium, triethylgallium, trimethylindium, triethylindium and their derivatives. Reaction temperature of (a) can vary depending on the character of the amine compound, but a reaction temperature of about 10 to about 40° C. is typically sufficient to avoid vigorous evolution of heat. Examples of suitable dialkylmagnesium compounds for (b) include butyloctylmagnesium, dibutylmagnesium, and butylethylmagnesium.

The transition metal complex of the present invention is formed via reaction (c), which can be run in parallel with reactions (a) and (b). The transition metal complex is prepared by reacting an early transition metal compound with a cyclic diene compound (Cd"). Typical early transition metal compounds, according to the present invention, are represented by the formula $M'O_pR^1_qX_r$ where $R^1$ is alkyl, X is halogen, e.g, Cl, F or Br, and p, q, and r are numbers from 0 to 4, and M' is Ti, Zr, or V. Reaction (c) can be represented schematically:

$$M'O_pR^1_qX_r + Cd'' \rightarrow [Cd''][M'O_pR^1_qX_r] \quad (c)$$

Reaction (c) is typically carried out in a non-polar solvent such as a hydrocarbon solvent. Examples of hydrocarbon solvents include hexane, heptane, and toluene. The transition metal compounds are Lewis acids and cyclic diene compounds are basic. Reaction (c) may result in an acid-base adduct or it may simply yield a mixture the titanium halide and the cyclic diene. Regardless, the resulting mixture can be used in following step (d) without further separation or purification.

The ratio of transition metal to cyclic diene (Cd") in reaction (c) is typically about 0.5 to about 3.0 and reaction typically proceeds at room temperature in about 0.5 to about 3 hours. Examples of early transition metal compounds suitable for step (c) include $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, $Ti(OC_2H_5)_2Cl_2$, $Ti(OC_4H_9)_2Cl_2$, $Ti(OC_8H_{17})Cl_3$, $Ti(OCH_3)_4$, $Ti(OC_2H_5)_4$, $Ti(OC_4H_9)_4$, $Zr(OC_4H_9)_2Cl_2$, $Zr(OC_8H_{17})Cl_3$, $VCl_3$, $VCl_4$, and $VOCl_3$. Particular preferred titanium compounds are titanium alkoxy halide compounds containing alkoxy ligands having 4 or more carbon atoms.

Cyclic diene compounds include any organic compounds containing a conjugated or non-conjugated diene in a cyclic ring structure. Such ring structures include cyclopentadiene, cyclohexadiene, cyclopentadiene, cyclooctadiene and their derivatives. Examples of particular cyclic diene compounds suitable for the present invention include cyclopentadiene, indene, fluorene, methylcyclopentadiene, dimethylcyclopentadiene, trimethylcyclopentadiene, tetramethylcyclopentadiene, pentamethylcyclopentadiene, (t-butyl)-cyclopentadiene, methylethylcyclopentadiene, trimethylsilylcyclopentadiene, triethylcyclopentadiene, 1,3-cyclohexadiene, 1,4-cyclohexadiene, 1,3-cycloheptadiene, cycloheptatriene, 1,3-cyclooctadiene, and 1,5-cyclooctadiene. Particularly preferred cyclic diene compounds have 4 to 9 carbon atoms.

Mixing the transition metal-cyclic diene compound prepared in step (c) with magnesium complex prepared in step (b) yields the catalyst component of the present invention. Schematically, this is shown by:

$$[Cd''][M'O_pR^1_qX_r] + \text{magnesium complex (b)} \rightarrow \text{catalyst component (d)} \quad (d)$$

According to one embodiment, magnesium complex (b) is added slowly to the mixture of titanium halide-cyclic diene compound until the molar ratio of Mg/Ti is about 0.5 to about 3.0. The reaction can be performed at low temperature, such as about 10 to about 30° C. and is typically allowed to react for about 3 hours or more. During the course of the reaction, magnesium alkoxide or magnesium halide precipitates and the catalyst component remains in solution. Typically, an aliphatic hydrocarbon solvent is used and the resulting catalyst component solution can be used directly in a polymerization without further separation or purification.

The catalyst system of the present invention typically comprises a magnesium halide support, even though the catalyst component is not typically immobilized on the magnesium halide support prior to introducing the catalyst component into a polymerization reactor. Typically, a magnesium halide support is injected into the (co)-polymerization reactor separately from the solution of the transition metal catalyst component. Alternatively, a magnesium halide support can be mixed with a solution of the transition metal catalyst component to yield a solution having a pre-determined M'/Mg ratio (M'=transition metal), which can be injected into a (co)-polymerization reactor.

As used herein, "magnesium halide support" refers to magnesium halide that is suitable for catalytic purposes. Various methods are known in the art for preparing suitable magnesium halide species and any of these methods can be employed for the present invention. For example, a spherical magnesium halide support can be obtained by reacting $R_2Mg$ solution with alkylhalide in mixed solvent of ether and heptane, as described in U.S. Pat. No. 4,987,212, the entire contents of which are incorporated herein by reference. U.S. Pat. No. 5,091,353, the entire contents of which are incorporated herein by reference, describes the reaction of a magnesium halide solution, in a mixed solvent of alcohol and hydrocarbon with alkylaluminum compounds to produce a magnesium halide support containing aluminum. U.S. Pat. No. 5,990,034, the entire contents of which are incorporated herein by reference, describes a method to prepare a magnesium halide support by reacting alkylmagnesium and alkylaluminum with chlorosilane compounds having Si—H bonds.

According to another embodiment of the invention, an inorganic carrier material such as silica containing magnesium can be used as a support. For example, U.S. Pat. No. 5,192,731, the entire contents of which are incorporated herein by reference, describes a method to prepare the silica containing magnesium by contacting silica with an organoaluminum compound, reacting the resulting species with a solution of magnesium halide dissolved in a hydrocarbon/alcohol solvent, and treating it with a reducing organometallic compound.

A suitable magnesium halide support can also be synthesized by reacting magnesium metal powder with an alkylhalide. Such a reaction can be initiated in the presence of aluminum alkoxide or zirconium alkoxide in non-polar solvent. Once initiated, the reaction generates magnesium halide solid. Typically, the reaction is initiated in the presence of $Al(OR')_3$ or $Zr(OR)_nX_{4-n}$ at a temperature of about 80° C. to about 100° C. The reaction can be maintained by continuously feeding it with alkylhalide and the proper amount $Al(OR)_3$ or $Zr(OR)_nX_{4-n}$ until all the magnesium powder is consumed. A small amount of an electron donating organic chemical such as an ester or alkoxysilane can be used to control the particle size of the magnesium halide support. After the magnesium powder is consumed, the reaction mixture is typically stirred at about 80° C. to about 100° C. for an additional 1–4 hours to complete formation of a magnesium halide support.

The in-situ catalyst system of the present invention typically comprises an alkylaluminum co-catalyst. The alkylaluminum co-catalyst is used in an amount effective to promote the (co)-polymerization activity of the catalyst component. Typically, the amount of alkylaluminum co-catalyst used is sufficient to give an Al/Ti molar ratio of about 2 to about 500, more typically about 2 to about 100, and even more typically about 2 to about 30. Examples of suitable alkylaluminum co-catalysts include trialkylaluminums, for example, triethylaluminum, tributylaluminum, trioctylaluminum, trimethylaluminum; dialkylaluminum halides, for example, diethylaluminumchloride, and dibutylaluminumchloride; and alkylaluminum sesquichloride, for example, ethylaluminumsesquichloride and butylaluminmsesquichloride.

The in-situ catalyst system of the present invention can be used to polymerize ethylene or co-polymerize ethylene with α-olefins typically having 3 to 10 carbon atoms, more typically 4 to 10 carbon atoms, in the presence of organo-metallic aluminum co-catalyst. Examples of suitable α-olefins include propylene, 1-butene, 1-pentene, 1-hexene, 4-methyl-1-pentene, 3-methyl-1-pentene, 1-octene and 1-decene. The feeding ratio of the transition metal catalyst component and the solid magnesium halide support typically provides a M'/Mg ratio into polymerization reactor of about 0.05 to about 2.0 The polymerization of ethylene or co-polymerization of ethylene with an α-olefin, can be performed in the liquid or vapor phase in the presence or absence of an inert polymerization solvent. The polymerization temperature using the catalyst system of present invention is typically about 20 to about 150° C. The polymerization pressure can be from atmospheric to about 100 Kg/cm$^2$-G, and is typically about 2 to about 50 Kg/cm$^2$-G. The polymerization or co-polymerization using the catalyst system of present invention can be performed in the presence of hydrogen to control the molecular weight of the polymer.

One of the measures of molecular weight distribution of a resin is the melt flow ratio (MFR), which is the ratio of high load melt index (HLMI or $I_{21.6}$) to melt index (MI or $I_{2.16}$). MFR is defined herein as:

$$MFR = I_{21.6}/I_{2.16}$$

For a typical resin, MFR tends to increase as MI ($I_{2.16}$) decreases and MFR value tends to decrease as MI ($I_{2.16}$) increases. The melt flow ratio is believed to be an indication of the molecular weight distribution of the polymer with a higher value corresponding to a broader molecular weight distribution. Resins having relatively low MFR values for a given MI ($I_{2.16}$) have relatively narrow molecular weight distribution. LLDPE resins having relatively low MFR values produce films of better strength properties than resins with high MFR values.

The catalyst component of present invention, in the presence of ordinary alkylaluminum co-catalyst, can polymerize ethylene-copolymer having a narrow molecular weight distribution and an improved branching composition distribution, as indicated by smaller MFRs (21.6 kg/2.16 kg) and lower melting points than the co-polymer made with comparative catalysts. Also, the catalyst component of present invention shows improved co-monomer response shown by lower density of resulting polymer than polymers produced using reference catalysts at the same co-monomer/ ethylene molar ratio. The in-situ catalyst system of present invention is useful and for the production of LLDPE resin having density of 0.910 to 0.960 g/cm$^3$ from ethylene and an α-olefin having 3 to 10 carbons.

EXAMPLES

Example 1

Preparation of Catalyst component. Steps (a) and (b). A 100 mL hexane solution of 1 molar triethylaluminum (100 mmol) was placed in 200 mL flask and 200 mmol of dicyclohexylamine was added slowly over 30 minutes. Stirring for 1 hour yielded a pale yellow aluminum solution. Dibutylmagnesium solution (50 mmol, in heptane) was added to the pale yellow aluminum solution. Mild heat and gas was evolved and a clear yellow solution resulted. Stirring was continued for 6 hours at room temperature. This hexane solution was used for step (d), below.

Step (c). TiCl$_3$(OC$_8$H$_{17}$) (50 mmol) and 100 mL hexane were placed in 500 mL flask and 50 mmol of indene was added to precipitate a brown solid. After stirring for 30 minutes at room temperature, the liquid portion was decanted and the brown solid was washed with 100 mL hexane.

Step (d). The magnesium complex solution from step (b) (50 mmol Mg) was added to the brown solid slurry in hexane obtained from step (c) and the mixture was stirred at room temperature for 6 hours to obtain brown solution and a yellow solid. Brown solution portion was collected and used as the transition metal catalyst component without any further purification. Analysis results show that the solution contains 0.2 mmol Ti per 1 ml solution, i.e., it is 0.2 M in Ti.

Preparation of magnesium halide support. ZrCl$_4$ (30 mmol) was mixed with 100 mL hexane and reacted with 120 mmol of 2-ethylhexanol at room temperature for 1 hour to make a pale brown zirconium solution. Magnesium powder (3.2 g), 10 mL butylchloride, 400 mL hexane, and 0.23 g of iodine were introduced successively into 1-liter glass flask, and a 6 mmol Zr amount of zirconium solution prepared above was added. The mixture was heated to 60° C. to initiate the reaction over the course of 1 hour, followed by the slow addition of 15 ml of n-butylchloride over the course of 4 hours. At the end of addition, the reaction mixture was stirred for an additional 2 hours at 70° C. before it was cooled to room temperature (20° C.). The precipitate obtained was washed three times with hexane to yield granule type solid magnesium halide support having an average particle size of 50 μm.

Ethylene Polymerization. A 2.0 liter autoclave reactor was purged with nitrogen and charged with 1000 mL of purified hexane. The temperature was raised to 65° C., and 2.0 mmol of (n-C$_8$H$_{17}$)$_3$Al, 0.05 g of magnesium halide support, and 0.1 mmol of the catalyst component in hexane were injected. The autoclave was pressurized at 16 psi with hydrogen and the total pressure was raised to 90 psi with ethylene. The polymerization was carried out at 85° C. for 1 hour. After polymerization, the polymer suspension was filtered and the polymer was dried. Polymer bulk density was 0.32. Polymerization results are summarized in Table 1.

Ethylene/1-hexene Co-polymerization. A 2.0 liter autoclave reactor was purged with nitrogen and charged with 1000 mL of purified hexane. 1-Hexene (60 mL) was injected and the temperature was raised to 65° C. and (n-C$_8$H$_{17}$)$_3$Al (2.0 mmol), 0.05 g of magnesium halide support, and 0.1 mmol of the titanium catalyst component in hexane were injected. The autoclave was pressurized at 16 psi with hydrogen and then at the total pressure was raised to 90 psi with ethylene. The polymerization was carried out at 85° C. for 30 min. After polymerization, methanol was added to quench the reaction and the polymer suspension was filtered and dried. Polymerization results are summarized in Tables 1 & 2.

Example 2

Preparation of Catalyst Component. The titanium catalyst component was prepared according to steps (a)–(d) described for Example 1.

Preparation of magnesium halide support. A solid magnesium halide support containing aluminum was prepared according to U.S. Pat. No. 5,091,353. Briefly, 4.8 g of anhydrous magnesium chloride, 23 mL of 2-ethylhexylalcohol and 200 mL decane were reacted at 140° C. for 3 hours to yield a clear solution containing magnesium chloride. While the solution was stirred, a mixed solution of 7.1 mL of triethylaluminum and 45 mL of decane at 20° C. was added over 30 minutes. Thereafter, the mixture was heated to 80° C. over the course of 2.5 hours and sustained at 80° C. for an additional 1 hour. The resulting slurry was allowed to settle. The supernatant was removed, and 200 mL decane and 6.3 mL (50 mmol) of diethylaluminum chloride were added to the remaining solid. The mixture was reacted at 80° C. for 1 hour and the solid portion was then separated by filtration and washed once with 100 mL of decane to yield a solid magnesium chloride support.

Ethylene and Ethylene/1-hexene (Co)-Polymerization. Polymerization was carried out in the same way as in Example 1 and results are listed in Tables 1 & 2.

Example 3

Preparation of Catalyst Component. The titanium catalyst component was prepared according to steps (a)–(d) described for Example 1.

Preparation of a Magnesium Halide Support. A solid magnesium halide support containing aluminum was prepared according to U.S. Pat. No. 5,106,804. Briefly, 200 mL hexane was mixed with 172 mL of 0.865 M butyloctylmagnesium solution in heptane and 60 mL of diisoamylether. The reactor was then heated to 50° C. and 32 mL of tert-butylchloride was added dropwise over the course of 3 hours. At the end of this addition, the suspension was maintained at 50° C. for 2 hours and the precipitate obtained was washed six times with hexane to yield a solid magnesium halide support.

Ethylene and Ethylene/1-hexene (Co)-Polymerization. Polymerization was carried out in the same way as in Example 1 and results are listed in Tables 1 & 2.

Example 4

Preparation of Catalyst Component. The titanium catalyst component was prepared according to steps (a)–(d) described for Example 1.

Preparation of a Magnesium Halide Support. Magnesium powder (3.2 g), 400 mL hexane, and 0.23 g of iodine were introduced successively into 1-liter glass flask, and the mixture was heated to 80° C., with stirring. When temperature reached 80° C. tri(sec-butoxy)aluminum (0.83 g) and 0.94 mL of ethylbenzoate were introduced rapidly, followed by the slow addition of 30 mL of n-butylchloride over the course of 4 hours. The reaction mixture was stirred at 80° C. for 2 additional hours and then cooled to room temperature (20° C.). The precipitate obtained was washed with hexane (3×400 mL each) to yield a solid magnesium halide support.

Ethylene and Ethylene/1-hexene (Co)-Polymerization. Polymerization was carried out in the same way as in Example 1 and results are listed in Tables 1 & 2.

Example 5–7

Preparation of Catalyst Component. The titanium catalyst component was prepared according to steps (a)–(d) described for Example 1 except that 2-ethylhexoxy titanium trichloride was replaced by following titanium compounds:

| Example | Titanium compound |
|---|---|
| 5 | $Ti(OBu)_2Cl_2$ |
| 6 | $Ti(OBu)Cl_3$ |
| 7 | $Ti(OEt)Cl_3$ |

Preparation of a Magnesium Halide Support. Magnesium halide support was prepared as described for Example 1.

Ethylene and Ethylene/1-hexene (Co)-Polymerization. Polymerization was carried out in the same way as in Example 1 and results are listed in Tables 1 & 2.

Example 8

Preparation of Catalyst Component. The titanium catalyst component was prepared according to steps (a)–(d) described for Example 1 except that 100 mmol of tert-butylamine was used instead of 200 mmol of dicyclohexylamine.

Preparation of a Magnesium Halide Support. Magnesium halide support was prepared as described for Example 1.

Ethylene and Ethylene/1-hexene (Co)-Polymerization. Polymerization was carried out in the same way as in Example 1 and results are listed in Tables 1 & 2.

Example 9–12

Preparation of Catalyst Component. The titanium catalyst component was prepared according to steps (a)–(d) described for Example 1, except indene was replaced by following cyclic diene compounds:

| Example | Cyclic diene |
|---|---|
| Example 9 | pentamethylcyclopentadiene |
| Example 10 | (t-butyl)cyclopentadiene |
| Example 11 | 1,3-cyclohexadiene |
| Example 12 | 1,5-cyclooctadiene |

Preparation of a Magnesium Halide Support. Magnesium halide support was prepared as described for Example 4.

Ethylene and Ethylene/1-hexene (Co)-Polymerization. Polymerization was carried out in the same way as in Example 1 and results are listed in Tables 1 & 2.

Example 13–15

Preparation of Catalyst Component. The titanium catalyst component was prepared according to steps (a)–(d) described for Example 1, except triethylaluminum was replaced by following group 13 metal-alkyl compounds.

| Example | Group 13 metal-alkyl, $R_3M$ |
|---|---|
| Example 13 | Triethylboron, $Et_3B$ |
| Example 14 | Trimethylaluminum, $Me_3Al$ |
| Example 15 | Trimethylindium, $Me_3In$ |

Preparation of a Magnesium Halide Support. Magnesium halide support was prepared as described for Example 4.

Ethylene and Ethylene/1-hexene (Co)-Polymerization. Polymerization was carried out in the same way as in Example 1 and results are listed in Tables 1 & 2.

Comparative Example 1

Preparation of Catalyst Component & Ethylene Polymerization. Magnesium halide support was prepared in the same way in Example 1. Titanium tetrachloride was used as a control titanium catalyst solution for in-situ polymerization. A 2.0 liter autoclave reactor was purged with nitrogen and charged with 1000 mL of purified hexane. After the temperature was raised to 65° C., 2.0 mmol of $(n-C_8H_{17})_3Al$, 0.05 g of magnesium halide support, and 0.1 mmol of $TiCl_4$ was injected. The autoclave was pressurized 16 psi with hydrogen and further pressurized to 90 psi with ethylene. The polymerization was carried out at 85° C. for 1 hour. After polymerization, the polymer suspension was filtered and polymer was dried to get 20 g of polymer. The product was a mixture of string-like and grain-shape morphology had a polymer bulk density of 0.11. From this example, it is clear that without using titanium complex of present invention, regular titanium halide component is not suitable for the in-situ polymerization. Results are listed in Tables 1 & 2.

Comparative Example 2

A magnesium halide support was prepared in the same way in Example 1. Magnesium support (3.0 g) was placed in 500 mL flask with 150 mL hexane. $(n-octyl)_3Al$ (6 mmol) was added and stirred for 6 hours at room temperature. $TiCl_3$(2-ethylhexoxy) (6 mmol) was added and the slurry mixture was stirred for 1 hour at room temperature. After the reaction, solution part was decanted and washed with 500 mL hexane. Analysis shows it contains 4.2% Ti.

Ethylene and Ethylene/1-hexene (Co)-Polymerization. Polymerization was carried out in the same way as in Example 1 and results are listed in Tables 1 & 2.

Comparative Example 3

A catalyst was prepared according to U.S. Pat. No. 4,748,221. Magnesium powder (3.2 g), 400 mL hexane, and 0.43 g of iodine were introduced successively into a 1-liter glass flask and the mixture was heated to 80° C. When temperature reached 80° C., 3.3 g of titanium tetrachloride and 5.0 g of tetrapropyltitanate were added, 30 mL of n-butylchloride was added slowly over 4 hours. The reaction mixture obtained was stirred for a further 2 hours at 80° C. then cooled to room temperature (20° C.). The solid precipitate was washed with hexane three times to yield a comparative catalyst component.

Ethylene and Ethylene/1-hexene (Co)-Polymerization. Polymerization was carried out in the same way as in Example 1 and results are listed in Tables 1 & 2.

TABLE 1

Ethylene Polymerization Results

| Example | Yield (g) | M.I. (2.16) | MFR* | B/D (g/cm³) | Polymer APS (μm) | Shape |
|---|---|---|---|---|---|---|
| 1 | 103 g | 0.8 | 26.5 | 0.33 | 620 | Granule |
| 2 | 130 g | 1.1 | 25.3 | 0.42 | 410 | Spherical |
| 3 | 95 g | 0.7 | 25.9 | 0.40 | 650 | Spherical |
| 4 | 107 g | 1.3 | 26.1 | 0.32 | 350 | Granule |
| 5 | 110 g | 1.0 | 26.0 | 0.32 | 630 | Granule |
| 6 | 115 g | 1.5 | 25.0 | 0.33 | 640 | Granule |
| 7 | 105 g | 1.2 | 25.1 | 0.32 | 650 | Granule |
| 8 | 120 g | 0.9 | 26.0 | 0.31 | 640 | Granule |
| 9 | 90 g | 0.5 | 26.0 | 0.32 | 560 | Granule |
| 10 | 95 g | 0.8 | 27.0 | 0.30 | 570 | Granule |
| 11 | 98 g | 0.6 | 26.5 | 0.33 | 590 | Granule |
| 12 | 88 g | 1.1 | 25.7 | 0.31 | 540 | Granule |
| 13 | 102 g | 1.3 | 25.4 | 0.32 | 620 | Granule |
| 14 | 130 g | 1.2 | 26.1 | 0.35 | 670 | Granule |
| 15 | 93 g | 0.8 | 25.3 | 0.31 | 620 | Granule |
| Comp-1 | 20 g | 0.1 | 47 | 0.13 | — | String-like |
| Comp-2 | 143 g | 1.91 | 38.2 | 0.30 | 630 | Granule |
| Comp-3 | 109 g | 1.31 | 32.1 | 0.31 | 620 | Granule |

*MFR = $I_{21.6}/I_{2.16}$

TABLE 2

Ethylene / 1-Hexene Co-Polymerization Results

| Example | Yield (g) | M.I.(2.16) | MFRR | Polymer Density (g/cm³) |
|---|---|---|---|---|
| 1 | 85 g | 1.0 | 25.0 | 0.9250 |
| 2 | 101 g | 1.1 | 25.1 | 0.9255 |
| 3 | 84 g | 1.2 | 25.3 | 0.9260 |
| 4 | 94 g | 1.3 | 25.7 | 0.9245 |
| 5 | 82 g | 1.7 | 24.2 | 0.9243 |
| 6 | 81 g | 1.3 | 24.9 | 0.9235 |
| 7 | 86 g | 1.8 | 24.0 | 0.9224 |
| 8 | 79 g | 1.1 | 25.5 | 0.9238 |
| 9 | 82 g | 0.9 | 26.1 | 0.9225 |
| 10 | 85 g | 1.2 | 25.1 | 0.9236 |
| 11 | 81 g | 1.5 | 24.6 | 0.9231 |
| 12 | 70 g | 0.7 | 26.5 | 0.9250 |
| 13 | 82 g | 1.2 | 24.3 | 0.9220 |
| 14 | 105 g | 1.1 | 24.5 | 0.9223 |
| 15 | 78 g | 0.9 | 25.2 | 0.9210 |
| Comp-1 | 10 g | 0.3 | 45 | 0.9362 |
| Comp-2 | 101 g | 2.5 | 32.2 | 0.9330 |
| Comp-3 | 82 g | 1.857 | 30.41 | 0.9301 |

One of skill in the art will appreciate that the present invention provides a catalyst system that fully satisfies the objects, aims, and advantage set forth above. In particular, a catalyst system effective for catalyzing the (co)-polymerization of α-olefin is disclosed.

According to one embodiment, the catalyst system comprises a catalyst component prepared by:
(a) reacting a compound having the formula $R_3M$ with an amine having a nitrogen-hydrogen bond;
(b) reacting the product of (a) with a dialkylmagnesium compound;
(c) reacting a compound containing a cyclic diene group with an early transition metal compound; and
(d) reacting the product of (b) with the product of (c);
wherein R is hydrocarbon and M is selected from the group consisting of aluminum, boron, gallium, and indium. According to one embodiment, $R_3M$ is selected from the group consisting of triethylborane, tributylborane, trimethylaluminum, triethylaluminum, tri-isobutylaluminum, trihexylaluminum, trioctylaluminum, and trimethylgallium, triethylgallium, trimethylindium, and triethylindium and the amine is selected from the group consisting of butylamine, t-butylamine, hexylamine, heptylamine, dibutylamine, di-sec-butylamine, di-tert-butylamine, dihexylamine, dicyclo-hexylamine, piperidine, aniline, 2,6-diethylaniline, and 2,6-di-tert-butylaniline. Particularly suitable amines having a nitrogen-hydrogen bond are cyclic amines, for example piperidine, pyrrolidine, pyrrole dicyclopentylamine, dicyclohexylamine, dicycloheptylamine, and dicyclooctylamine. According to one embodiment of the invention, the dialkylmagnesium compound is selected from the group consisting of butyloctylmagnesium, dibutylmagnesium, and butylethylmagnesium and the compound containing a cyclic diene group is selected from cyclopentadiene, indene, (t-butyl)-cyclopentadiene, methylethylcyclopentadiene, 1,3-cyclohexadiene, and 1,5-cyclooctadiene. Particularly suitable early transition metal compounds are those having the formula $M'O_pR_qX_r$, wherein R is alkyl, X is halogen, and p, q, and r are numbers from 0 to 4, and M' is Ti, Zr, or V.

The catalyst system of the present invention typically comprises a solid magnesium halide support and an alkylaluminum co-catalyst. Examples of suitable alkylaluminum co-catalysts are those selected from the group consisting of triethylaluminum, tributylaluminum, trioctylaluminum, and trimethylaluminum.

A further aspect of the present invention is a method of (co)-polymerizing α-olefin, using the catalyst system disclosed herein. According to one embodiment, a hydrocarbon solution that contains the early transition metal complex and the cyclic diene is used in situ with a solid magnesium halide support and an alkylaluminum co-catalyst to (co)-polymerizing α-olefin. The catalyst system of present invention produces polyethylene with a narrow molecular weight distribution and a narrow compositional distribution.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents, which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A catalyst system effective for catalyzing the (co)-polymerization of α-olefin, the catalyst system comprising a catalyst component prepared by:
    (a) reacting a compound having the formula $R_3M$ with an amine having a nitrogen-hydrogen bond;
    (b) reacting the product of (a) with a dialkylmagnesium compound;
    (c) reacting a compound containing a cyclic diene group with an early transition metal compound; and
    (d) reacting the product of (b) with the product of (c);
wherein R is hydrocarbon and M is selected from the group consisting of aluminum, boron, gallium, and indium.

2. The catalyst system of claim 1, wherein R is a $C_{1-13}$ hydrocarbon.

3. The catalyst system of claim 1, wherein $R_3M$ is selected from the group consisting of triethylborane, tributylborane, trimethylaluminum, triethylaluminum, triisobutylaluminum, trihexylaluminum, trioctylaluminum, and trimethylgallium, triethylgallium, trimethylindium, and triethylindium.

4. The catalyst system of claim 1, wherein the amine having a nitrogen-hydrogen bond is selected from the group consisting of butylamine, t-butylamine, hexylamine, heptylamine, dibutylamine, di-sec-butylamine, di-tert-butylamine, dihexylamine, dicyclo-hexylamine, piperidine, aniline, 2,6-diethylaniline, and 2,6-di-tert-butylaniline.

5. The catalyst system of claim 1, wherein the amine having a nitrogen-hydrogen bond is a cyclic amine.

6. The catalyst system of claim 1, wherein the amine having a nitrogen-hydrogen bond is selected from the group consisting of piperidine, pyrrolidine, and pyrrole.

7. The catalyst system of claim 1, wherein the amine having a nitrogen-hydrogen bond is selected from the group consisting of dicyclopentylamine, dicyclohexylamine, dicycloheptylamine, and dicyclooctylamine.

8. The catalyst system of claim 1, wherein the dialkylmagnesium compound is selected from the group consisting of butyloctylmagnesium, dibutylmagnesium, and butylethylmagnesium.

9. The catalyst system of claim 1, wherein the compound containing a cyclic diene group is selected from cyclopentadiene, indene, (t-butyl)-cyclopentadiene, methylethylcyclopentadiene, 1,3-cyclohexadiene, and 1,5-cyclooctadiene.

10. The catalyst system of claim 1, wherein the early transition metal compound has the formula $M'O_pR^1_qX_r$, wherein O is oxygen, $R^1$ is alkyl, X is halogen, and p, q, and r are numbers from 0 to 4, and M' is Ti, Zr, or V.

11. The catalyst system of claim 1, wherein the early transition metal compound is selected from the group consisting of $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, $Ti(OC_2H_5)_2Cl_2$, $Ti(OC_4H_9)_2Cl_2$, $Ti(OC_8H_{17})Cl_3$, $Ti(OCH_3)_4$, $Ti(OC_2H_5)_4$, $Ti(OC_4H_9)_4$, $Zr(OC_4H_9)_2Cl_2$, $Zr(OC_8H_{17})Cl_3$, $VCl_3$, $VCl_4$, $VOCl_3$.

12. The catalyst system of claim 1, further comprising a solid magnesium halide support.

13. The catalyst system of claim 1, further comprising an alkylaluminum co-catalyst.

14. The catalyst system of claim 1, further comprising an alkylaluminum co-catalyst selected from the group consisting of triethylaluminum, tributylaluminum, trioctylaluminum, and trimethylaluminum.

15. The catalyst system of claim 1, further comprising a hydrocarbon solvent.

16. A method of (co)-polymerizing α-olefin, the method comprising contacting an α-olefin feed stock with a catalyst system effective for catalyzing the (co)-polymerization of α-olefin, wherein the catalyst system comprises a catalyst component prepared by:
    (a) reacting a compound having the formula $R_3M$ with an amine having a nitrogen-hydrogen bond;
    (b) reacting the product of (a) with a dialkylmagnesium compound;
    (c) reacting a compound containing a cyclic diene group with an early transition metal compound; and
    (d) reacting the product of (b) with the product of (c);
wherein R is hydrocarbon and M is selected from the group consisting of aluminum, boron, gallium, and indium.

17. The method of claim 16, wherein R is a $C_{1-13}$ hydrocarbon.

18. The method of claim 16, wherein $R_3M$ is selected from the group consisting of triethylborane, tributylborane, trimethylaluminum, triethylaluminum, triisobutylaluminum, trihexylaluminum, trioctylaluminum, and trimethylgallium, triethylgallium, trimethylindium, and triethylindium.

19. The method of claim 16, wherein the amine having a nitrogen-hydrogen bond is selected from the group consisting of butylamine, t-butylamine, hexylamine, heptylamine, dibutylamine, di-sec-butylamine, di-tert-butylamine, dihexylamine, dicyclo-hexylamine, piperidine, aniline, 2,6-diethylaniline, and 2,6-di-tert-butylaniline.

20. The method of claim 16, wherein the amine having a nitrogen-hydrogen bond is a cyclic amine.

21. The method of claim 16, wherein the amine having a nitrogen-hydrogen bond is selected from the group consisting of piperidine, pyrrolidine, and pyrrole.

22. The method of claim 16, wherein the amine having a nitrogen-hydrogen bond is selected from the group consisting of dicyclopentylamine, dicyclohexylamine, dicycloheptylamine, and dicyclooctylamine.

23. The method of claim 16, wherein the dialkylmagnesium compound is selected from the group consisting of butyloctylmagnesium, dibutylmagnesium, and butylethylmagnesium.

24. The method of claim 16, wherein the compound containing a cyclic diene group is selected from cyclopentadiene, indene, (t-butyl)-cyclopentadiene, methylethylcyclopentadiene, 1,3-cyclohexadiene, and 1,5-cyclooctadiene.

25. The method of claim 16, wherein the early transition metal compound has the formula $M'O_p R^1_q X_r$ wherein O is oxygen, $R^1$ is alkyl, X is halogen, and p, q, and r are numbers from 0 to 4, and M' is Ti, Zr, or V.

26. The method of claim 16, wherein the early transition metal compound is selected from the group consisting of $Ti(OCH_3)Cl_3$, $Ti(OC_2H_5)Cl_3$, $Ti(OC_4H_9)Cl_3$, $Ti(OC_8H_{17})Cl_3$, $Ti(OCH_3)_2Cl_2$, $Ti(OC_2H_5)_2Cl_2$, $Ti(OC_4H_9)_2Cl_2$, $Ti(OC_8H_{17})Cl_3$, $Ti(OCH_3)_4$, $Ti(OC_2H_5)_4$, $Ti(OC_4H_9)_4$, $Zr(OC_4H_9)_2Cl_2$, $Zr(OC_8H_{17})Cl_3$, $VCl_3$, $VCl_4$, $VOCl_3$.

27. The method of claim 16, wherein the catalyst system further comprises a solid magnesium halide support.

28. The method of claim 16, wherein the catalyst system further comprises an alkylaluminum co-catalyst.

29. The method of claim 16, wherein the catalyst system further comprises an alkylaluminum co-catalyst selected from the group consisting of triethylaluminum, tributylaluminum, trioctylaluminum, and trimethylaluminum.

\* \* \* \* \*

UNITED STATES PATENT AND TRADEMARK OFFICE
CERTIFICATE OF CORRECTION

PATENT NO. : 6,956,003 B2 Page 1 of 1
DATED : October 18, 2005
INVENTOR(S) : Gapgoung Kong and Honglan Lu It is certified that error appears in the above-identified patent and that said Letters Patent is hereby corrected as shown below:

<u>Column 16,</u>
Line 8, insert -- and -- after "$VCI_4$,".

Signed and Sealed this

Tenth Day of January, 2006

JON W. DUDAS
*Director of the United States Patent and Trademark Office*